US009264975B2

(12) United States Patent
Diachina et al.

(10) Patent No.: US 9,264,975 B2
(45) Date of Patent: Feb. 16, 2016

(54) POST ACCESS POLICING IN A MOBILE COMMUNICATION NETWORK

(75) Inventors: John Diachina, Garner, NC (US); Paul Schliwa-Bertling, Ljungsbro (DE); Andreas Bergström, Vikingstad (SE); Claes-Göran Persson, Mjölby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 593 days.

(21) Appl. No.: 13/070,176

(22) Filed: Mar. 23, 2011

(65) Prior Publication Data
US 2011/0235581 A1 Sep. 29, 2011

Related U.S. Application Data

(60) Provisional application No. 61/317,910, filed on Mar. 26, 2010.

(51) Int. Cl.
*H04W 80/04* (2009.01)
*H04W 48/02* (2009.01)

(52) U.S. Cl.
CPC .................................... *H04W 48/02* (2013.01)

(58) Field of Classification Search
CPC ... H04L 67/02; H04L 67/306; H04L 63/0876; H04L 63/1466; H04L 67/1002; H04L 67/28; H04L 67/2823
See application file for complete search history.

(56) References Cited

U.S. PATENT DOCUMENTS

| | | | |
|---|---|---|---|
| 2002/0038380 A1* | 3/2002 | Brawn et al. | 709/238 |
| 2002/0075859 A1 | 6/2002 | Mizell et al. | |
| 2004/0081132 A1* | 4/2004 | Toniatti et al. | 370/345 |
| 2004/0131057 A1* | 7/2004 | Miyashita | 370/389 |
| 2005/0272438 A1* | 12/2005 | Holur et al. | 455/452.2 |
| 2006/0177063 A1* | 8/2006 | Conway et al. | 380/270 |
| 2008/0201486 A1* | 8/2008 | Hsu et al. | 709/238 |
| 2009/0083830 A1* | 3/2009 | Lum et al. | 726/1 |
| 2009/0097436 A1* | 4/2009 | Vasudevan et al. | 370/328 |
| 2009/0186612 A1* | 7/2009 | Aghili | 455/432.1 |
| 2010/0057485 A1 | 3/2010 | Luft | |
| 2011/0143712 A1* | 6/2011 | Christensson et al. | 455/410 |
| 2011/0199905 A1* | 8/2011 | Pinheiro et al. | 370/235 |

\* cited by examiner

*Primary Examiner* — Brian J Gillis
*Assistant Examiner* — Thao Duong

(57) ABSTRACT

When a wireless terminal attaches to the network, the wireless terminal is assigned a temporary identifier. Different sets of access restrictions are associated with different blocks of temporary identifiers. When a message and a corresponding temporary identifier is received by the network from a requesting wireless terminal, an access controller identifies the block to which the assigned temporary identifier belongs and determines the access restrictions associated with that block.

28 Claims, 4 Drawing Sheets

POST ACCESS POLICING IN A MOBILE COMMUNICATION NETWORK

RELATED APPLICATION

This application claims the benefit of U.S. Provisional Patent Application 61/317,910 filed Mar. 26, 2010, which is incorporated herein by reference.

BACKGROUND

The present invention relates generally to policing network access by wireless terminals and, more particularly, to policing network access by machine type communication (MTC) devices.

The anticipated introduction of a large volume of machine-type communication (MTC) devices in the near future will greatly increase the demand on the resources of communication networks. MTC devices are devices, such as meters or sensors, that collect and send data to an MTC server or other MTC device over a communication network. It is expected that MTC devices will soon far outnumber non-MTC devices, such as user terminals for voice and data communications by human users.

Although MTC devices may have network access restrictions stored in memory, network operators may not wish to rely on MTC devices to police their own usage of network resources. If the MTC devices choose to ignore these restrictions, or if the restrictions are omitted from the MTC devices, network payload could be adversely affected to the detriment of other network users.

SUMMARY

The present invention provides a method and apparatus for controlling network access by wireless terminals, such as MTC devices. When a wireless terminal attaches to the network, the wireless terminal is assigned a temporary identifier. Different sets of access restrictions are associated with different blocks of temporary identifiers. When a message is received from a requesting wireless terminal, an access controller identifies the block to which the assigned temporary identifier belongs and determines the access restrictions associated with that block. The access controller may store the association between access restrictions and corresponding blocks in a local database to reduce signaling over the network. In some embodiments of the invention, the temporary identifier comprises a packet temporary mobile subscriber identifier (P-TMSI).

Exemplary embodiments of the invention comprise methods of determining what restrictions apply to a wireless terminal attempting to access the communication network to transmit a message, wherein the process of message transmission necessarily includes the conveyance of a temporary identifier associated with the wireless terminal. One exemplary method comprises associating different sets of access restrictions with different blocks of temporary identifiers, each said block comprising a range of temporary identifiers; receiving a message from a wireless terminal (100) that is assigned a temporary identifier selected from one of said blocks of temporary identifiers; identifying, from said message, the block to which the temporary identifier belongs; and determining the set of access restrictions associated with the identified block.

Other embodiments of the invention comprise a base station configured to police network access by wireless terminals wherein the network access involves the wireless terminal conveying a message along with an associated temporary identifier. One exemplary base station comprises a memory, a transceiver circuit, and an access controller. The memory stores a local database that associates different sets of access restrictions with different blocks of temporary identifiers. The transceiver circuit receives a message from a wireless terminal that is assigned a temporary identifier selected from one of said blocks of temporary identifiers. The access controller is configured to identify, from said message, the block to which the temporary identifier belongs and to determine the set of access restrictions associated with the identified block.

DETAILED DESCRIPTION

Figure 1:
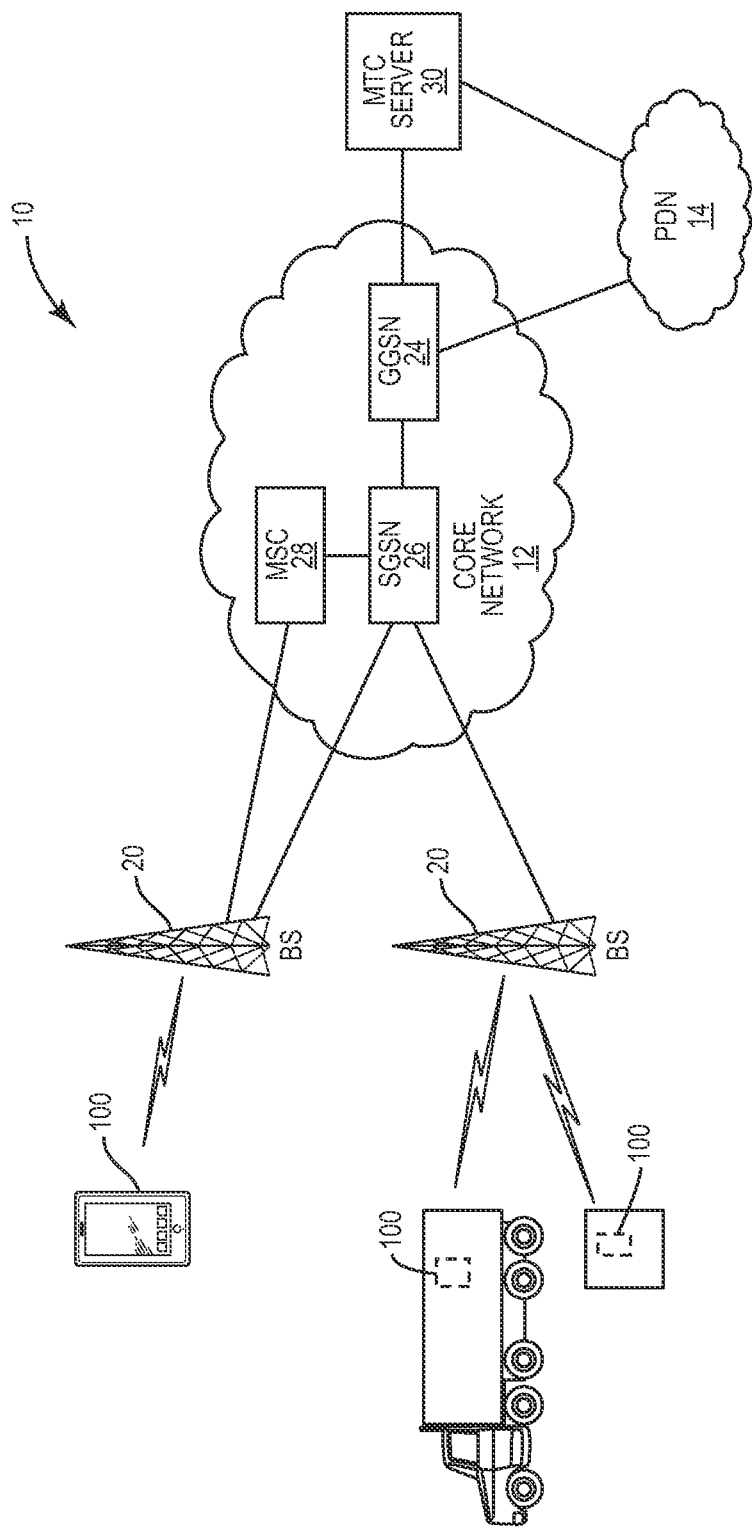
FIG. 1 illustrates an exemplary wireless communication network for communication by wireless terminals such as MTC devices.

Referring now to the drawings, FIG. 1 illustrates an exemplary wireless communication network 10 including a core network 12, a plurality of base stations 20, and a plurality of wireless terminals 100. The communication network 10 may operate according to any communication standard that employs a contention-based random access channel (RACH). For illustrative purposes, an exemplary embodiment of the present invention will be described in the context of a network operating according to the GSM/EDGE (Global System for Mobile Communication (GSM) Packet Radio Service) standard. Those skilled in the art will appreciate, however, that the present invention is more generally applicable to other wireless communication systems, including Wideband Code Division Multiple Access (WCDMA), Long-Term Evolution (LTE), and Worldwide Interoperability for Microwave Access (WiMAX) systems.

The base stations 20 provide network access to mobile wireless terminals 100 operating within the coverage area of the network 10. The core network 12 comprises a Mobile Switching Center (MSC) 28, Serving GPRS Support Node (SGSN) 26, and Gateway GPRS Support Node (GGSN) 24. Mobile Switching Center (MSC) 28 controls each of the base stations 20, and routes voice calls to and from the wireless terminals 100. The SGSN 26 is responsible for delivery of data packets to and from the wireless terminals 100 for packet-switched services. The GGSN 24 provides connection to external packet data network 14, such as the Internet. The wireless terminals 100 may communicate with one or more servers, such as MTC server 30, connected to the wireless communication network 10 or packet data network 14.

The wireless terminals 100 may comprise machine-type communication (MTC) devices for collecting and reporting of data over a communication network, or may comprise non-MTC devices. Machine Type Communications (MTC) has been defined as a specific type of wireless communication network traffic. See, e.g., 3GPP Technical Report 23.888, "System Improvements for Machine-Type Communications," the disclosure of which is incorporated herein by reference in its entirety. One example of an MTC device is a gas or power meter with a wireless transceiver for reporting at predetermined time periods usage of gas or electrical power to the MTC server 30. Non-MTC devices are devices, such as a cell phone, smart phone, laptop computer, etc., used for voice and data communications by human users. An MTC device may comprise a dedicated device specifically used for data collection and reporting. In other embodiments, a combined wireless terminal 100 may function part of the time as a MTC device and part of the time as a non-MTC device.

MTC server 30 may store subscription information for the wireless terminals 100 operating as MTC devices. The subscription information may include, for example, access restrictions that apply to MTC devices. The access restrictions may be device specific or application specific. As will be explained in greater detail below, the access restrictions may be associated with blocks of temporary identifiers and used to police network access by the wireless terminals 100. The MTC server 30 may also be used to store MTC data uploaded by the wireless terminals 100.

Figure 2:
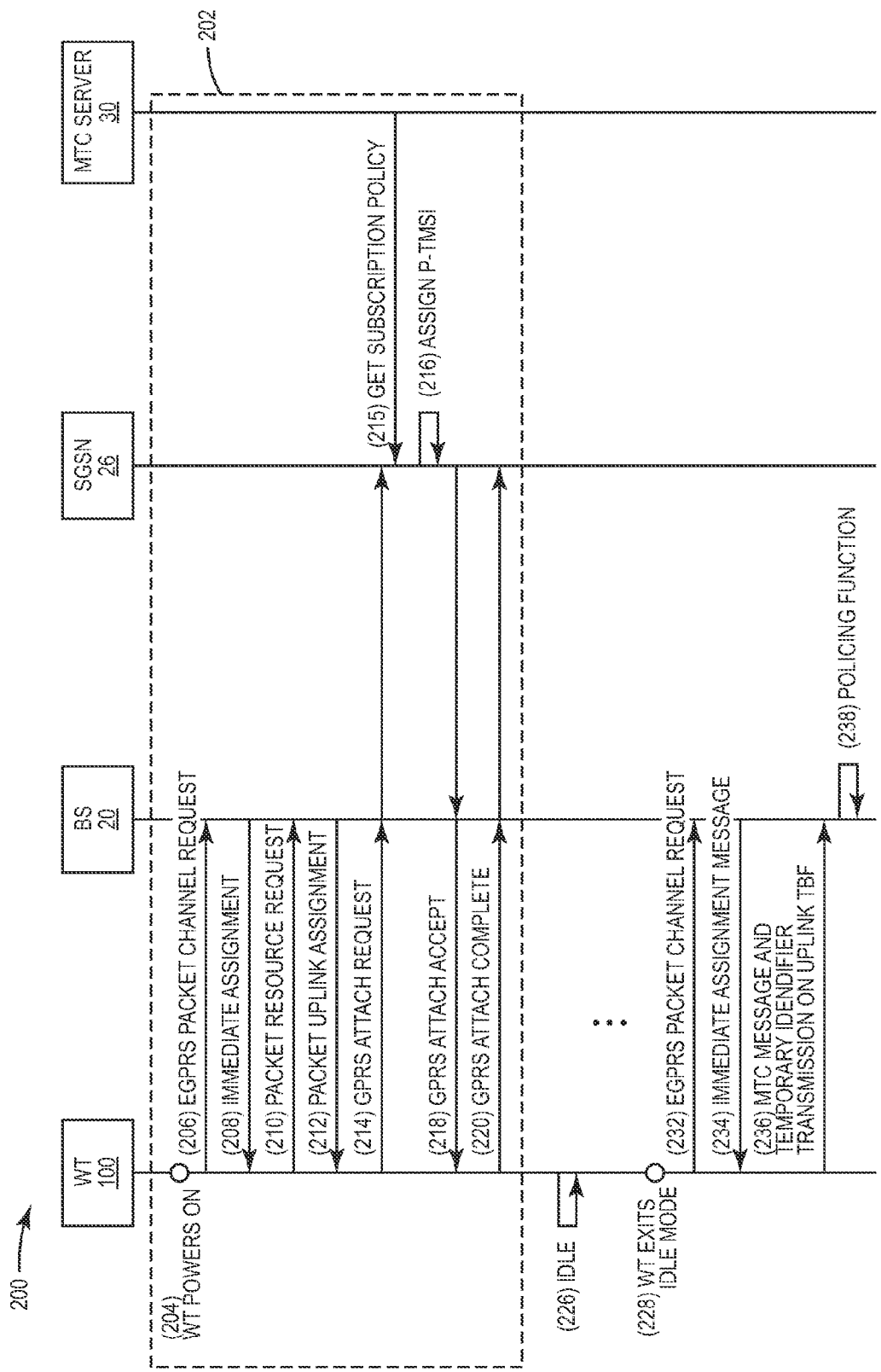
FIG. 2 illustrates an exemplary procedure for policing network access of a wireless terminal.

FIG. 2 illustrates an exemplary procedure 200 for policing network access by wireless terminals 100, such as MTC devices. Those skilled in the art will appreciate, however, that the policing procedure can also be used to police network access by non-MTC devices. When the wireless terminal 100 is powered on, the wireless terminal 100 performs an attachment procedure, such as the GPRS attachment procedure 202 shown in FIG. 2, to attach to the core network 12. The wireless terminal 100 sends an Enhanced General Packet Radio Service (EGPRS) packet channel request on a contention-based RACH (step 206) to commence the attachment procedure 202. The base station 20 responds to the packet channel request by transmitting an Immediate Assignment message to the wireless terminal 100 indicating the winner of the contention, and granting the winner either a one phase packet access or a two phase packet access (step 208). Assuming the transmitting wireless terminal 100 is the winner of the contention-based access request, the wireless terminal 100 switches to a packet data channel (PDCH) and transmits a Packet Resource Request describing the radio access capabilities and supported frequency band of the wireless terminal 100 (step 210). In one example the Packet Resource Request includes a "random" TLLI in a Radio Link Control (RLC) packet header. In one exemplary embodiment, the TLLI identifies the wireless terminal 100 as an MTC device that is not attached. The random TLL thus informs the base station 20 that it is dealing with a MTC device. The use of the TLLI is described in more detail below.

The base station 20 responds to the Packet Resource Request by sending the wireless terminal 100 a Packet Uplink Assignment message (step 212) indicating radio resources assigned on one or more PDCHs to be used by the wireless terminal 100. Steps 206-212 collectively define an uplink temporary block flow (TBF) establishment procedure that allocates a TBF for the wireless terminal 100 to use for communicating with the base station 20. Once the uplink TBF is established, the wireless terminal 100 switches to the assigned PDCH to transmit a GPRS Attach Request message via the determined uplink TBF (step 214). In one example the Attach Request has a "type of attach" field that indicates "MTC Device Attach," and may further indicate in that field, or in another field, an MTC device type that the wireless terminal 100 corresponds to. The base station 20 relays the GPRS Attach Request message to the Serving GPRS Support Node (SGSN) 26 (step 214).

Upon receipt of the attach request message, the SGSN 26 assigns a P-TMSI to the wireless terminal 100 (step 216). As will be hereinafter described in more detail, the assignment of the P-TMSI may be based on attributes of the MTC device and/or application attempting to access the network 10. The SGSN 26 may determine the device and/or applications attributes from the attach request message received from the wireless terminal 100. Alternatively, the SGSN 26 may optionally query the MTC server 30 to determine device and/or applications attributes. In some embodiments, the SGSN 26 may also determine what access restrictions apply to the device or application. The SGSN 26 then sends a "GPRS Attach Accept" message to the wireless terminal 100 (step 218), which include the assigned P-TMSI of step 216, and which triggers the establishment of a downlink TBF for the wireless terminal 100. The wireless terminal 100 uses the assigned uplink TBF (see steps 206-212) to transmit a GPRS Attach Complete message (step 220), which completes the attachment process 202 and enables the wireless terminal 100 to transmit and receive messages with the MTC server 30 using the currently assigned uplink TBF and downlink TBF, or using subsequent TBF resources established when the wireless terminal 100 needs to transmit or receive MTC data. The wireless terminal 100 may use these uplink and downlink TBF resources to upload MTC data to the MTC server 30, for example. The wireless terminal 100 will derive a temporary logical link identifier (TLLI) from the P-TMSI assignment it receives in step 218 and will use that TLLI to identify itself whenever the wireless terminal 100 attempts a subsequent network access in the geographical area for which its assigned P-TMSI is valid.

After completion of the attachment procedure 202, the wireless terminal 100 may optionally enter an idle state and release its TBF resources while still retaining its GPRS attachment and assigned P-TMSI (step 226). Alternatively, the wireless terminal 100 may remain active between the completion of step 220 and the performance of step 236, in which case steps 226-234 are not performed. If the wireless terminal 100 becomes idle in step 226, the wireless terminal 100 may try to communicate with MTC server 30 by sending another EGPRS packet channel request (step 232), and the base station 20 may respond by transmitting an Immediate Assignment message (step 234). The wireless terminal 100 may then initiate an uplink MTC data transmission using its assigned TBF (step 236) wherein the procedure for MTC data transmission involves the wireless terminal 100 also identifying itself using its TLLI. In exemplary embodiments of the present invention, the base station 20 applies a policing function to the uplink TBF to ensure compliance with the access restrictions applicable to the access attempt by the wireless terminal 100.

Some specific examples of subscription policy restrictions may include times at which the wireless terminal 100 is prohibited from using core network 12 resources, permissible and prohibited types of network access for the wireless terminal 100, a maximum permissible amount of data transmission within a predefined time period for the wireless terminal 100, or a maximum permissible data transmission rate for the wireless terminal 100.

Different access restrictions may be applied to different access attempts depending on the purposes of the access attempt. For example, if the wireless terminal 100 is a gas meter, the wireless terminal 100 may be instructed to upload raw gas usage data daily between 2 AM-3 AM, and to upload average gas usage data only once a month.

Figure 4:
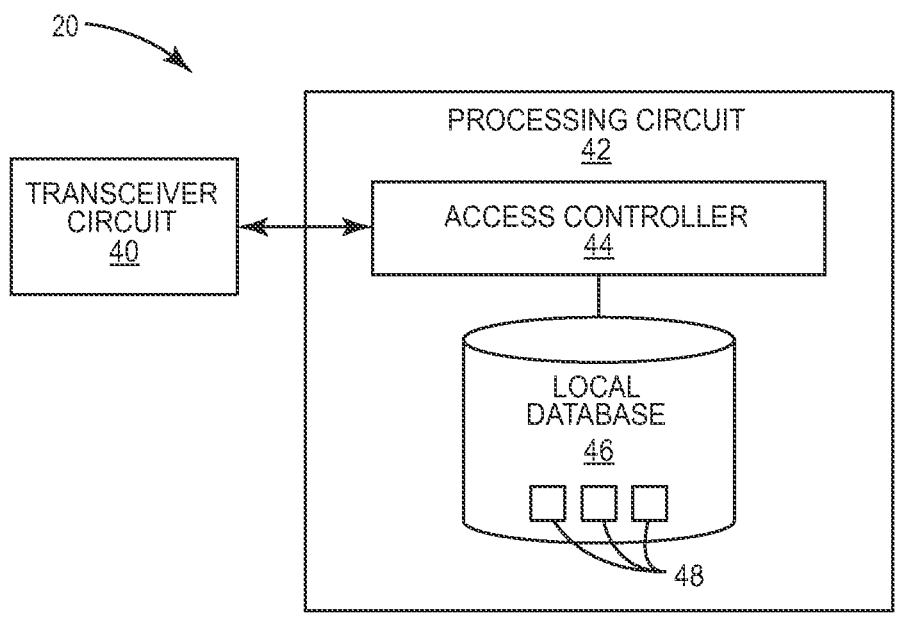
FIG. 4 illustrates an example base station including an access controller.

The access restrictions are enforced by an access controller 44 at the base station 20 (FIG. 4). In one example, the access controller 44 prevents the wireless terminal 100 from transmitting some or all RLC data blocks corresponding to MTC data that the wireless terminal 100 has to send for a current system access. In one example, step 238 includes releasing the TBF used by the wireless terminal 100 in step 236 for the current system access. In one example, step 238 includes sending the wireless terminal 100 a message to suspend the wireless terminal 100 from making additional system accesses for a specified period of time.

In one example, the access controller 44 may selectively enable and disable features in the wireless terminal 100. For example, the wireless terminal 100 may be capable of transmitting multiple different types of data, and the subscription policy may instruct the wireless terminal 100 to only transmit selected ones of those types of data, or to change the type of data that was previously being transmitted to another type of data.

As previously noted, a set of access restrictions may be associated with a block of temporary identifiers to facilitate the policing of wireless terminals 100. During the attachment procedure, the SGSN 26 selects a temporary identifier (e.g., P-TMSI) for the wireless terminal 100 based on an attribute of the wireless terminal 100 or application attempting the system access. During subsequent access attempts, the wireless terminal 100 includes TLLI information either within signaling messages transmitted to establish an uplink TBF (e.g. two phase access) or within the header of RLC data blocks transmitted after TBF establishment (e.g. one phase access) thereby allowing the base station 20 to determine the block to which the corresponding assigned P-TMSI belongs. The access controller 44 at the base station 20 may then determine the applicable access restrictions based on the P-TMSI block.

Figure 5:
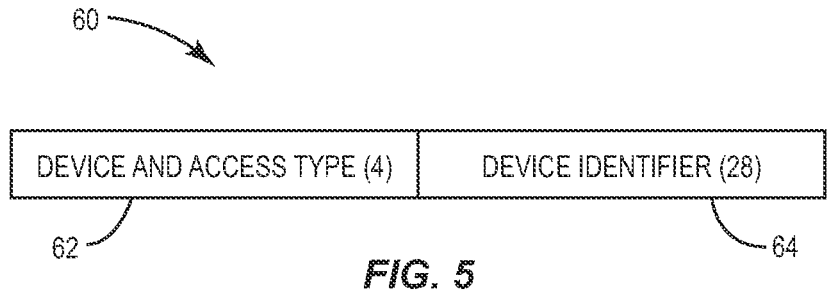
FIG. 5 illustrates an exemplary Temporary Logical Link Identifier (TLLI) for a wireless terminal.

In one exemplary embodiment, the data packets transmitted by the wireless terminal 100 include a Radio Link Protocol (RLC) header. The RLC header includes a TLLI that may be classified into two groups: a random TLLI for initial access or when changing routing area, and a local TLLI for normal operation after the wireless terminal 100 becomes attached. In exemplary embodiments of the invention, the TLLI is formatted as shown in FIG. 5. The TLLI includes two parts. The first part 62 comprising 4 bits identifies the type of the wireless terminal 100 and the access type. The second part 64 comprising 28 bits functions as a temporary wireless terminal identifier at the RLC protocol level.

In one exemplary embodiment, the four most significant bits (MSBs) of the random TLLI are set to "0100" to indicate that the wireless terminal 100 is an MTC device that is not currently attached or has changed routing areas. The four MSBs of the local TLLI are set to "0101" to indicate that the wireless terminal 100 is an MTC device and is currently attached. For a random TLLI, the wireless terminal identifier 64 may be randomly chosen by the wireless terminal 100. For a local TLLI, the wireless terminal identifier may be used to uniquely identify the P-TMSI group to which the wireless terminal 100 belongs. For example, the least significant 28 bits of the wireless terminal identifier may be set equal to bits 0 through 27 of the P-TMSI assigned to the wireless terminal 100.

If a wireless terminal 100 operating as an MTC device has just powered ON and is not GPRS attached, or if the wireless terminal 100 has left a routing area in which it first became GPRS attached, the wireless terminal 100 transmits a "random" MTC TLLI which set bits 62 equal to "0100" to indicate that the wireless terminal 100 is an MTC device, and to indicate that the wireless terminal 100 is not GPRS attached, and bits 64 are randomly chosen, for example. If the wireless terminal 100 is already GPRS attached and is still in the same routing area of its attachment, the wireless terminal 100 transmits a "local" MTC TLLI which sets bits 62 equal to "0101" to indicate that the wireless terminal 100 is an MTC device, and to indicate that the wireless terminal 100 is GPRS attached, and sets bits 64 equal to the P-TMSI or a portion of the P-TMSI. In one example the bits 64 (i.e. bits 0-27 of the TLLI) are set equal to bits 0-27 of the P-TMSI. Of course, these are only examples, and it is understood that other TLLI values could be used.

The example of using twenty-eight bits in the TLLI to transmit the P-TMSI group would result in up to $2^{28}$=26, 8435,456 possible MTC-TLLIs. Based on the MTC-TLLI, the base station 20 can determine the appropriate set of access restrictions to apply to the access attempt by the wireless terminal 100. More specifically, the TLLI identifies the P-TMSI group to which the assigned P-TMSI belongs based on the bits in the TLLI. The restrictions applicable to each P-TMSI group can be stored in a local database 46 in memory of the base station 20. The policing function at the base station 20 can identify data packets transmitted by MTC devices (also known as MTC data or MTC messages) and select the appropriate set of restrictions based on the TLLI contained in the RLC data block header or conveyed within the signaling messages used for TBF establishment. However, if the restrictions for the P-TMSI group are for some reason not available in the local database 46, the base station 20 may query the MTC server 30 for the restrictions based solely on the base station 20 recognizing the wireless terminal 100 as being an MTC device. The base station 20 applies restrictions to the wireless terminal 100 to control network resource usage of the wireless terminal 10.

Figure 3:
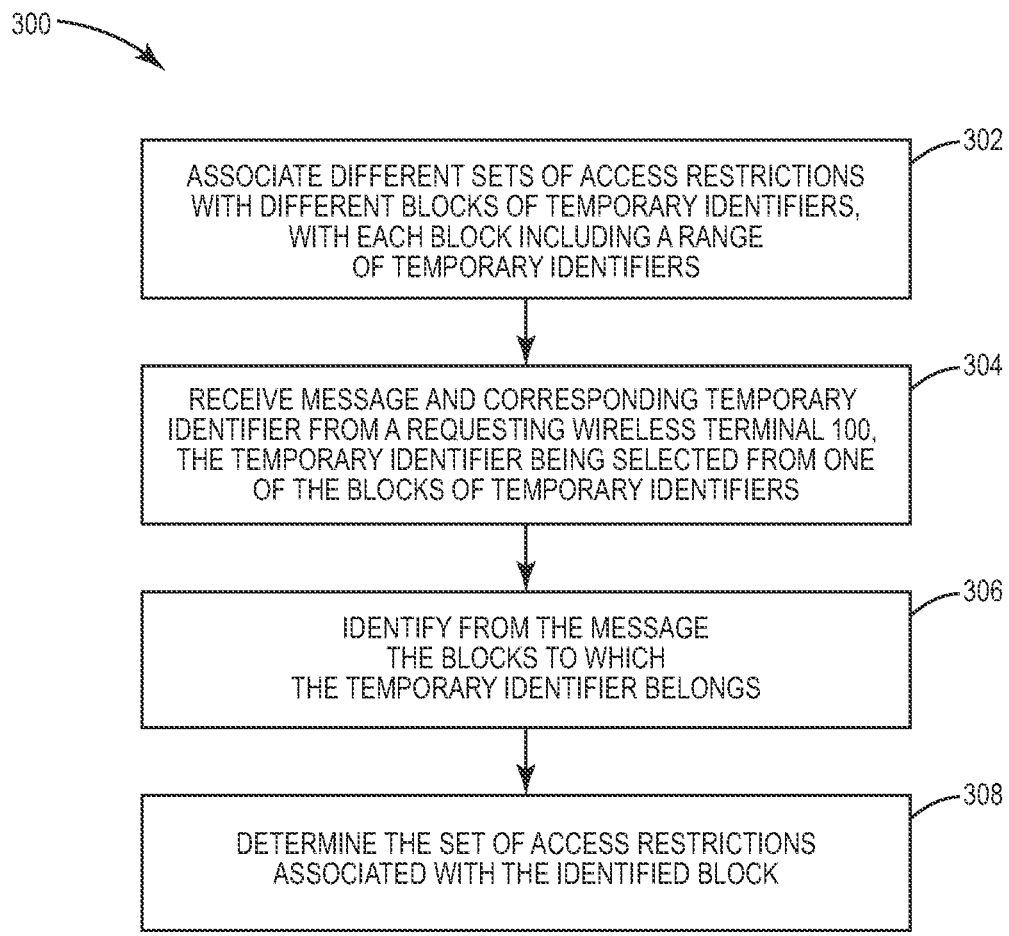
FIG. 3 illustrates an exemplary method implemented by an access controller of determining restrictions for a wireless terminal.

FIG. 3 illustrates an exemplary method 300 implemented by a base station 20 of determining restrictions for a wireless terminal 100. To begin the procedure, different sets of access restrictions are associated with different blocks of temporary identifiers (e.g. P-TMSIs) (step 302). The base station 20 receives an MTC message having an associated temporary identifier (e.g. the MTC message+temporary identifier of step 236) from a requesting wireless terminal 100 that is assigned a temporary identifier selected from one of the blocks of temporary identifiers (step 304). In one example, the P-TMSI is associated with the message by including the P-TMSI, or a portion of the P-TMSI, into the header of the message (e.g. the RLC header). From the TLLI conveyed along with the message, the access controller 44 at the base station 20 derives the corresponding P-TMSI which the access controller 44 then uses to identify the block of temporary identifiers to which the assigned temporary identifier belongs (step 306) and determines the set of access restrictions based on the identified block (step 308). In one embodiment, a selected P-TMSI block is used only for MTC devices. In this embodiment, the access controller 44 can identify the P-TMSI block based on the wireless terminal 100 identifying itself as an MTC device. In other embodiments, the P-TMSI block to which the assigned P-TMSI belongs may be explicitly identified using some or all of the assigned P-TMSI.

FIG. 4 schematically illustrates an example base station 20 configured to police access attempts by wireless terminals 100. The base station 20 includes a transceiver circuit 40 and a processing circuit 42. The processing circuit 42 includes an access controller 44 and a local database 46 that locally stores the restrictions applicable to different P-TMSI groups. In one example the transceiver circuit 40 includes a base transceiver station (BTS). The access controller 44 performs the policing function as herein described. Thus, the base station 20 is able to reduce core network 12 congestion by preventing unauthorized data transmissions from wireless terminals 20 from reaching the SGSN 26, GGSN 24 and the MTC server 30, and by reducing signaling with the SGSN 26, GGSN 24 and the MTC server 30.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method in a radio base station of determining access restrictions for a wireless terminal, comprising:
    associating different sets of access restrictions with different blocks of temporary identifiers, each of said blocks comprising a range of temporary identifiers;
    receiving a message and a corresponding temporary identifier from a wireless terminal, the temporary identifier being selected from one of said blocks of temporary identifiers;
    identifying, from the temporary identifier associated with said message, the block to which the temporary identifier belongs;
    determining the set of access restrictions associated with the identified block; and,
    controlling network resource usage by the wireless terminal to enforce said access restrictions.

2. The method of claim 1, wherein said wireless terminal is a machine-type communication (MTC) device and said temporary identifier is selected from a block of temporary identifiers for MTC devices.

3. The method of claim 2 wherein identifying the block to which the temporary identifier belongs comprises identifying the block based on the wireless terminal identifying itself as an MTC device.

4. The method of claim 1 wherein identifying the block to which the temporary identifier belongs comprises identifying the block based on an explicit mapping of terminal identifiers to corresponding blocks.

5. The method of claim 4, wherein said temporary identifiers comprise packet temporary mobile subscriber identifiers (P-TMSIs).

6. The method of claim 5, wherein a temporary logical link identifier (TLLI) associated with said message uniquely maps to the P-TMSI assigned to the wireless terminal, and wherein identifying the block to which the temporary identifier belongs comprises uniquely mapping the TLLI to a corresponding P-TMSI block.

7. The method of claim 1, wherein controlling network resource usage by the wireless terminal includes preventing the wireless terminal from transmitting some or all radio link control (RLC) data blocks the wireless terminal has to send for a current system access.

8. The method of claim 1, wherein controlling network resource usage by the wireless terminal includes releasing a temporary block flow (TBF) used by the wireless terminal in a current system access.

9. The method of claim 1, wherein said step of controlling network resource usage by the wireless terminal includes sending the wireless terminal a radio resource control (RRC) message to suspend the wireless terminal from making additional system accesses for a specified period of time.

10. The method of claim 1, wherein said one or more restrictions indicate times at which the wireless terminal is prohibited from using network resources.

11. The method of claim 1, wherein said one or more restrictions include at least one permissible type of network access for the wireless terminal, and at least one prohibited type of network access for the wireless terminal.

12. The method of claim 1, wherein said one or more restrictions include a maximum permissible amount of data transmission within a predefined time period for the wireless terminal.

13. The method of claim 1, wherein said one or more restrictions include a maximum permissible data transmission rate for the wireless terminal.

14. The method of claim 1, wherein said access restrictions include a first set of access restrictions applicable to a first set of wireless terminals having a common first set of attributes, and a second set of access restrictions applicable to a second set of wireless terminals having a common second set of attributes.

15. A radio base station for determining access restrictions for a wireless terminal, comprising:
    memory storing a local database that associates different sets of access restrictions with different blocks of temporary identifiers;
    a transceiver circuit to receive a message from a wireless terminal that has an associated temporary identifier selected from one of said blocks of temporary identifiers; and
    an access controller to control network access by said wireless terminal, said access controller configured to:
        identify, from the temporary identifier associated with said message, the block to which the assigned temporary identifier belongs; and
        determine the set of access restrictions associated with the identified block; and,
        control network resource usage by the requesting wireless terminal to enforce said one or more access restrictions.

16. The base station of claim 15, wherein said wireless terminal is a machine-type communication (MTC) device and said temporary identifier is selected from a block of temporary identifiers for MTC devices.

17. The base station of claim 16 wherein the access controller is further configured to identify the block to which the temporary identifier belongs based on the wireless terminal identifying itself as an MTC device.

18. The base station of claim 15 wherein the access controller is further configured to identifying the block to which the temporary identifier belongs based on an explicit mapping of terminal identifiers to corresponding blocks.

19. The base station of claim 18, wherein said temporary identifiers comprise packet temporary mobile subscriber identifiers (P-TMSI).

20. The base station of claim 19, wherein a temporary logical link identifier (TLLI) associated with said message uniquely maps to the P-TMSI assigned to the wireless terminal, and wherein the access controller is further configured to identify the block to which the temporary identifier belongs by uniquely mapping the TLLI to a corresponding P-TMSI block.

21. The base station of claim 15, wherein said access controller controls network resource usage by preventing the wireless terminal from transmitting some or all radio link control (RLC) data blocks the wireless terminal has to send for a current system access.

22. The base station of claim 15, wherein said access controller controls network resource usage by releasing a temporary block flow (TBF) used by the wireless terminal in the current system access.

23. The base station of claim 15, The base station of claim 22, wherein said access controller controls network resource usage by sending the wireless terminal a radio resource control (RRC) message to suspend the wireless terminal from making additional system accesses for a specified period of time.

24. The base station of claim 15, wherein said one or more restrictions indicate times at which the wireless terminal is prohibited from using network resources.

25. The base station of claim 15, wherein said one or more restrictions include at least one permissible type of network access for the wireless terminal, and at least one prohibited type of network access for the wireless terminal.

26. The base station of claim 15, wherein said one or more restrictions include a maximum permissible amount of data transmission within a predefined time period for the wireless terminal.

27. The base station of claim 15, wherein said one or more restrictions include a maximum permissible data transmission rate for the wireless terminal.

28. The base station of claim 15, wherein said access controller is configured to apply a first set of access restrictions to a first set of wireless terminals having a common first set of attributes, and a second set of access restrictions to a second set of wireless terminals having a common second set of attributes.

* * * * *